US010882411B2

(12) United States Patent
Yang et al.

(10) Patent No.: US 10,882,411 B2
(45) Date of Patent: Jan. 5, 2021

(54) SMART CHARGING SCHEDULES FOR BATTERY SYSTEMS AND ASSOCIATED METHODS FOR ELECTRIFIED VEHICLES

(71) Applicant: FORD GLOBAL TECHNOLOGIES, LLC, Dearborn, MI (US)

(72) Inventors: Xiao Guang Yang, Northville, MI (US); James Matthew Marcicki, Livonia, MI (US); Pratima Addepalli, Saline, MI (US); Devang Bhalchandra Dave, Ann Arbor, MI (US); Jianbo Lu, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 262 days.

(21) Appl. No.: 15/873,956

(22) Filed: Jan. 18, 2018

(65) Prior Publication Data
US 2019/0217716 A1 Jul. 18, 2019

(51) Int. Cl.
*H02J 7/00* (2006.01)
*B60L 53/60* (2019.01)
*B60L 53/14* (2019.01)
*H01M 10/42* (2006.01)

(52) U.S. Cl.
CPC ............. *B60L 53/60* (2019.02); *B60L 53/14* (2019.02); *H02J 7/0071* (2020.01); *B60L 2240/622* (2013.01); *B60L 2240/66* (2013.01); *B60L 2240/68* (2013.01); *H01M 10/4257* (2013.01); *H02J 7/0021* (2013.01); *H02J 7/0027* (2013.01); *H02J 7/00034* (2020.01); *H02J 7/0048* (2020.01)

(58) Field of Classification Search
CPC .......... H02J 7/0073; B60L 53/60; B60L 53/14
USPC ........................................................ 320/109
See application file for complete search history.

(56) References Cited

U.S. PATENT DOCUMENTS

| 4,992,942 A | * | 2/1991 | Bauerle | A01G 31/00 700/284 |
| 6,459,175 B1 | * | 10/2002 | Potega | H02J 9/061 307/149 |
| 7,389,209 B2 | * | 6/2008 | Masiello | G06Q 10/06 703/2 |
| 7,474,995 B2 | * | 1/2009 | Masiello | G06Q 10/06 703/2 |
| 7,719,232 B2 | | 5/2010 | Kelty et al. | |
| 7,782,021 B2 | * | 8/2010 | Kelty | B60L 3/0092 320/155 |
| 7,786,704 B2 | * | 8/2010 | Kelty | B60L 3/0092 320/155 |
| 8,054,038 B2 | * | 11/2011 | Kelty | B60L 3/0046 320/109 |

(Continued)

FOREIGN PATENT DOCUMENTS

| JP | 2011062014 A | * | 3/2011 | ................ B60L 7/16 |
| JP | 4816780 B2 | * | 11/2011 | ................ B60L 1/00 |

*Primary Examiner* — John T Trischler
(74) *Attorney, Agent, or Firm* — David B. Kelley; Carlson, Gaskey & Olds

(57) ABSTRACT

A method includes controlling charging a battery pack of an electrified vehicle, via a control system of the electrified vehicle, based on climate conditions, traffic conditions, and learned driving habits of a driver of the electrified vehicle. The control system is configured to create a smart charging schedule for either adding or not adding an additional charge to the battery pack in anticipation of an expected upcoming drive cycle.

23 Claims, 4 Drawing Sheets

(56) References Cited

U.S. PATENT DOCUMENTS

| | | | |
|---|---|---|---|
| 8,294,420 B2* | 10/2012 | Kocher | B60L 53/53 320/109 |
| 8,428,804 B2* | 4/2013 | Sakai | B60L 7/16 180/65.28 |
| 8,564,454 B2* | 10/2013 | Oizumi | B60L 53/30 340/901 |
| 8,612,075 B2* | 12/2013 | Atluri | B60L 1/003 701/22 |
| 8,624,719 B2* | 1/2014 | Klose | B60L 53/30 340/455 |
| 8,725,306 B2* | 5/2014 | Ramezani | B60L 53/63 700/297 |
| 8,849,512 B2* | 9/2014 | Filev | G01C 21/3641 701/36 |
| 8,890,473 B2* | 11/2014 | Muller | B60L 3/04 320/109 |
| 8,922,329 B2* | 12/2014 | Davis | H02J 7/025 340/3.1 |
| 8,937,452 B2 | 1/2015 | Schwarz et al. | |
| 8,965,669 B2* | 2/2015 | Fisher | B60L 53/68 701/117 |
| 9,000,722 B2* | 4/2015 | Uyeki | B60L 53/305 320/109 |
| 9,024,744 B2* | 5/2015 | Klose | B60L 53/68 340/455 |
| 9,026,347 B2 | 5/2015 | Gadh et al. | |
| 9,054,532 B2* | 6/2015 | Sortomme | H02J 7/00 |
| 9,152,202 B2* | 10/2015 | Seinfeld | G06F 1/3206 |
| 9,296,309 B2* | 3/2016 | Gibeau | B60K 37/02 |
| 9,348,381 B2* | 5/2016 | Khoo | G06F 1/26 |
| 9,387,772 B2* | 7/2016 | Usuki | H01M 10/44 |
| 9,424,745 B1* | 8/2016 | Kagoshima | G08G 1/052 |
| 9,428,072 B2 | 8/2016 | Chang et al. | |
| 9,440,654 B2* | 9/2016 | Atluri | B60W 10/06 |
| 9,463,704 B2* | 10/2016 | Hyde | G05B 19/042 |
| 9,476,725 B2* | 10/2016 | Fisher | B60L 53/68 |
| 9,527,400 B2 | 12/2016 | Rhodes et al. | |
| 9,550,430 B2* | 1/2017 | Toggenburger | G06Q 10/06 |
| 9,610,853 B1* | 4/2017 | Miller | G01C 21/3679 |
| 9,618,954 B2* | 4/2017 | Masuda | H01M 10/44 |
| 9,689,692 B2* | 6/2017 | Takehara | B60L 53/60 |
| 9,731,617 B2 | 8/2017 | Tseng et al. | |
| 9,731,618 B2* | 8/2017 | Asai | B60L 53/31 |
| 9,738,287 B2* | 8/2017 | Bolger | F16H 57/0413 |
| 9,739,624 B2* | 8/2017 | Rajagopalan | G01C 21/3415 |
| 9,744,873 B2* | 8/2017 | Riley | B60L 3/12 |
| 9,845,016 B2* | 12/2017 | Sortomme | H02J 7/00 |
| 9,849,871 B2* | 12/2017 | Dunlap | B60W 20/13 |
| 9,914,462 B2* | 3/2018 | Porras | B60K 6/445 |
| 9,937,808 B2* | 4/2018 | Evans | B60L 11/1825 |
| 9,939,868 B2* | 4/2018 | Shuster | H04M 1/72563 |
| 9,956,887 B2* | 5/2018 | Duan | B60L 11/1861 |
| 9,987,944 B2* | 6/2018 | Dunlap | B60L 53/14 |
| 9,995,591 B2* | 6/2018 | Shimizu | G01C 21/3469 |
| 10,017,068 B2* | 7/2018 | McGrath | B60L 58/12 |
| 10,026,998 B2* | 7/2018 | Li | B60L 3/12 |
| 10,112,728 B2* | 10/2018 | Evans | B64F 1/36 |
| 10,113,881 B2* | 10/2018 | Hoch | B60L 3/12 |
| 10,141,694 B2* | 11/2018 | Geo | H01R 13/713 |
| 10,161,759 B2* | 12/2018 | Fisher | B60L 58/12 |
| 10,169,783 B2* | 1/2019 | Khoo | G06F 1/26 |
| 10,185,977 B2* | 1/2019 | Khoo | G06F 1/26 |
| 10,185,978 B2* | 1/2019 | Khoo | G06F 1/26 |
| 10,192,245 B2* | 1/2019 | Khoo | G06F 1/26 |
| 10,210,552 B2* | 2/2019 | Khoo | G06F 1/26 |
| 10,272,793 B2* | 4/2019 | Perry | B60L 53/65 |
| 10,286,802 B2* | 5/2019 | Kim | B60H 1/00392 |
| 10,288,439 B2* | 5/2019 | Pedersen | B60L 58/16 |
| 10,293,699 B2* | 5/2019 | Zhao | G06Q 10/1093 |
| 10,308,128 B2* | 6/2019 | Gibeau | B60K 37/02 |
| 10,369,890 B1* | 8/2019 | Sosinov | H02J 7/025 |
| 10,399,461 B1* | 9/2019 | Sosinov | B60L 53/35 |
| 10,467,911 B2* | 11/2019 | Kneuper | G06N 20/00 |
| 2004/0006502 A1* | 1/2004 | Masiello | G06Q 10/06 703/2 |
| 2004/0039622 A1* | 2/2004 | Masiello | G06Q 10/06 703/2 |
| 2007/0208492 A1* | 9/2007 | Downs | G08G 1/0104 701/117 |
| 2007/0208497 A1* | 9/2007 | Downs | G08G 1/0104 701/117 |
| 2008/0027639 A1* | 1/2008 | Tryon | B60K 6/46 701/533 |
| 2008/0046165 A1* | 2/2008 | Downs | G08G 1/0104 701/117 |
| 2008/0211230 A1* | 9/2008 | Gurin | B60K 6/28 290/2 |
| 2009/0021218 A1* | 1/2009 | Kelty | B60L 3/0092 320/137 |
| 2009/0212745 A1* | 8/2009 | Kelty | B60L 58/12 320/162 |
| 2009/0216688 A1* | 8/2009 | Kelty | B60L 3/0092 705/418 |
| 2010/0026306 A1* | 2/2010 | Zhang | G01R 31/3647 324/426 |
| 2010/0094496 A1* | 4/2010 | Hershkovitz | B60L 3/12 701/22 |
| 2010/0188043 A1* | 7/2010 | Kelty | B60L 3/0046 320/109 |
| 2010/0213887 A1* | 8/2010 | Louch | B60L 1/02 320/101 |
| 2011/0018679 A1* | 1/2011 | Davis | H02J 7/025 340/3.1 |
| 2011/0047052 A1* | 2/2011 | Cornish | G06Q 10/06 705/30 |
| 2011/0066310 A1* | 3/2011 | Sakai | B60L 1/00 701/22 |
| 2011/0074350 A1* | 3/2011 | Kocher | B60L 53/53 320/109 |
| 2011/0144823 A1* | 6/2011 | Muller | B60L 3/04 700/297 |
| 2011/0202217 A1* | 8/2011 | Kempton | B60L 53/14 701/22 |
| 2011/0202418 A1* | 8/2011 | Kempton | B60L 53/64 705/26.1 |
| 2011/0210698 A1* | 9/2011 | Sakai | B60L 53/64 320/109 |
| 2011/0225105 A1* | 9/2011 | Scholer | G06Q 50/06 705/412 |
| 2012/0098676 A1* | 4/2012 | Oizumi | G08G 1/096716 340/901 |
| 2012/0109519 A1* | 5/2012 | Uyeki | B60L 50/51 701/439 |
| 2012/0133337 A1* | 5/2012 | Rombouts | H02J 7/0071 320/155 |
| 2012/0200257 A1* | 8/2012 | Schwarz | H01M 10/42 320/109 |
| 2012/0262104 A1* | 10/2012 | Kirsch | B60L 8/003 320/101 |
| 2012/0309455 A1* | 12/2012 | Klose | B60L 53/68 455/557 |
| 2013/0002188 A1* | 1/2013 | Uyeki | B60L 53/14 320/101 |
| 2013/0054045 A1* | 2/2013 | Ramezani | B60L 58/10 700/297 |
| 2013/0093393 A1* | 4/2013 | Shimotani | B60L 3/12 320/109 |
| 2013/0096751 A1* | 4/2013 | Riley | B60L 3/12 701/22 |
| 2013/0110296 A1* | 5/2013 | Khoo | G06F 1/26 700/286 |
| 2013/0179057 A1* | 7/2013 | Fisher | B60L 53/68 701/117 |
| 2013/0179061 A1* | 7/2013 | Gadh | H02J 3/14 701/123 |
| 2013/0197748 A1* | 8/2013 | Whitaker | B60L 53/14 701/34.4 |
| 2013/0229149 A1* | 9/2013 | Sortomme | H02J 7/00 320/109 |

(56) References Cited

U.S. PATENT DOCUMENTS

| | | | |
|---|---|---|---|
| 2014/0006137 A1* | 1/2014 | Melen | G06Q 10/1093 705/14.35 |
| 2014/0070606 A1* | 3/2014 | Gibeau | B60K 37/02 307/9.1 |
| 2014/0159660 A1* | 6/2014 | Klose | B60L 53/68 320/109 |
| 2014/0163789 A1* | 6/2014 | Yu | B60W 10/06 701/22 |
| 2014/0191722 A1* | 7/2014 | Usuki | H01M 10/44 320/109 |
| 2014/0217976 A1* | 8/2014 | McGrath | B60L 53/32 320/109 |
| 2014/0236379 A1 | 8/2014 | Masuda et al. | |
| 2014/0265566 A1* | 9/2014 | Nguyen | H02J 7/0068 307/23 |
| 2014/0288832 A1* | 9/2014 | Hoch | B60L 3/12 701/538 |
| 2014/0320089 A1 | 10/2014 | Wang et al. | |
| 2014/0340038 A1* | 11/2014 | Toggenburger | B60L 53/63 320/109 |
| 2014/0371969 A1* | 12/2014 | Asai | H02J 5/00 701/22 |
| 2015/0069975 A1* | 3/2015 | Farah | H02J 7/0019 320/150 |
| 2015/0091531 A1* | 4/2015 | Hyde | G05B 19/042 320/137 |
| 2015/0095114 A1* | 4/2015 | Hyde | G06Q 10/0639 705/7.38 |
| 2015/0115886 A1* | 4/2015 | Loftus | B60L 53/14 320/109 |
| 2015/0127248 A1* | 5/2015 | Fisher | B60L 53/68 701/414 |
| 2015/0175026 A1* | 6/2015 | Uyeki | B60L 53/305 320/109 |
| 2015/0191098 A1* | 7/2015 | Chang | B60L 58/16 701/22 |
| 2015/0251548 A1* | 9/2015 | Sortomme | H02J 7/00 320/109 |
| 2015/0323974 A1* | 11/2015 | Shuster | H04M 1/72563 713/320 |
| 2015/0329003 A1 | 11/2015 | Li et al. | |
| 2015/0345958 A1* | 12/2015 | Graham | G01C 21/343 701/22 |
| 2015/0345962 A1* | 12/2015 | Graham | G01C 21/343 701/430 |
| 2015/0345984 A1* | 12/2015 | Graham | G01C 21/3697 701/400 |
| 2015/0354974 A1* | 12/2015 | Takehara | B60L 53/60 701/423 |
| 2015/0360578 A1 | 12/2015 | Duan et al. | |
| 2015/0367740 A1* | 12/2015 | McGrath | B60L 11/184 320/137 |
| 2016/0096438 A1* | 4/2016 | Grimes | B60L 58/24 320/109 |
| 2016/0159240 A1* | 6/2016 | Tseng | B60L 58/12 320/109 |
| 2016/0193932 A1* | 7/2016 | Vaghefinazari | H02J 7/0021 320/109 |
| 2016/0200211 A1* | 7/2016 | Gibeau | B60L 58/12 701/22 |
| 2016/0221456 A1* | 8/2016 | Rhodes | B60L 11/1862 |
| 2016/0335377 A1* | 11/2016 | Yamashina | H02J 3/32 |
| 2016/0339792 A1* | 11/2016 | Khoo | G06F 1/26 |
| 2016/0339793 A1* | 11/2016 | Khoo | G06F 1/26 |
| 2016/0343011 A1* | 11/2016 | Yamashina | H02J 7/00047 |
| 2016/0362016 A1* | 12/2016 | Khoo | G06F 1/26 |
| 2016/0364658 A1* | 12/2016 | Khoo | G06F 1/26 |
| 2016/0364776 A1* | 12/2016 | Khoo | G06F 1/26 |
| 2017/0010114 A1* | 1/2017 | Fisher | B60L 53/68 |
| 2017/0028978 A1* | 2/2017 | Dunlap | B60W 20/13 |
| 2017/0072966 A1* | 3/2017 | Bolger | B60W 20/00 |
| 2017/0129359 A1* | 5/2017 | Dunlap | B60L 53/14 |
| 2017/0176195 A1* | 6/2017 | Rajagopalan | G01C 21/3415 |
| 2017/0210390 A1* | 7/2017 | Porras | B60W 30/18054 |
| 2017/0228003 A1* | 8/2017 | Brewer | G06F 1/266 |
| 2017/0235848 A1* | 8/2017 | Van Dusen | G06F 16/904 705/12 |
| 2017/0261331 A1* | 9/2017 | Shimizu | B60L 53/14 |
| 2018/0026404 A1* | 1/2018 | Geo | H01R 13/713 439/620.21 |
| 2018/0065494 A1* | 3/2018 | Mastrandrea | G06Q 10/02 |
| 2018/0072170 A1* | 3/2018 | Evans | B60L 11/1825 |
| 2018/0145514 A1* | 5/2018 | Prabhakar | H02J 7/0073 |
| 2018/0170202 A1* | 6/2018 | Kim | B60H 1/00392 |
| 2018/0222340 A1* | 8/2018 | Zhao | G06Q 10/1093 |
| 2018/0224915 A1* | 8/2018 | Shuster | H04M 1/72563 |
| 2018/0290546 A1* | 10/2018 | McGrath | B60L 11/184 |
| 2018/0361870 A1* | 12/2018 | Zhao | B60L 11/1846 |
| 2019/0084435 A1* | 3/2019 | Grace | B60L 58/12 |
| 2019/0139107 A1* | 5/2019 | Khoo | G06F 1/26 |
| 2019/0156382 A1* | 5/2019 | Khoo | G06F 1/26 |
| 2019/0156383 A1* | 5/2019 | Khoo | G06F 1/26 |
| 2019/0156384 A1* | 5/2019 | Khoo | G06F 1/26 |
| 2019/0180336 A1* | 6/2019 | Khoo | G06F 1/26 |
| 2019/0226860 A1* | 7/2019 | Fisher | B60L 53/60 |
| 2019/0275893 A1* | 9/2019 | Sham | B60L 53/305 |
| 2019/0316909 A1* | 10/2019 | White | G06N 5/02 |

* cited by examiner

SMART CHARGING SCHEDULES FOR BATTERY SYSTEMS AND ASSOCIATED METHODS FOR ELECTRIFIED VEHICLES

TECHNICAL FIELD

This disclosure relates to vehicle systems and methods for controlling charging of electrified vehicle battery packs.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle. The battery pack includes a plurality of battery cells that must be periodically recharged to replenish the energy necessary to power these loads. The battery pack is typically charged by connecting the vehicle to an external power source that transfers electric energy to the battery pack.

Most drivers plug-in their electrified vehicle for charging immediately after completing a trip. The battery pack is then charged to a full state of charge where it remains until the next trip begins. Thus, the battery packs are maintained at or near their full state of charge over a majority of their service life. Maintaining the batteries at relatively high states of charge for prolonged periods of time can negatively impact battery cell capacity and aging (i.e., reduced overall capacity and performance in terms of charging/discharging capabilities).

SUMMARY

A method according to an exemplary aspect of the present disclosure includes, among other things, controlling charging a battery pack of an electrified vehicle, via a control system of the electrified vehicle, based on climate conditions, traffic conditions, and learned driving habits of a driver of the electrified vehicle.

In a further non-limiting embodiment of the foregoing method, controlling the charging includes determining an excepted upcoming drive cycle to be traveled by the electrified vehicle.

In a further non-limiting embodiment of either of the foregoing methods, determining the expected upcoming drive cycle is based on historical route information associated with the electrified vehicle.

In a further non-limiting embodiment of any of the foregoing methods, the method includes determining whether the electrified vehicle is on-plug.

In a further non-limiting embodiment of any of the foregoing methods, the method includes determining an amount of charge necessary to complete an expected upcoming drive cycle of the electrified vehicle if the electrified vehicle is on-plug.

In a further non-limiting embodiment of any of the foregoing methods, the method includes determining whether the amount of charge necessary to complete the expected upcoming drive cycle is greater than a current state of charge of the battery pack.

In a further non-limiting embodiment of any of the foregoing methods, the method includes charging the battery pack if the amount of charge necessary to complete the expected upcoming drive cycle is greater than the current state of charge of the battery pack.

In a further non-limiting embodiment of any of the foregoing methods, the method includes adding zero charge to the battery pack if the current state of charge of the battery pack exceeds the amount of charge necessary to complete the expected upcoming drive cycle.

In a further non-limiting embodiment of any of the foregoing methods, controlling the charging includes creating a smart charging schedule based on the climate conditions, the traffic conditions, and the learned driving habits.

In a further non-limiting embodiment of any of the foregoing methods, the smart charging schedule is further based on GPS information.

In a further non-limiting embodiment of any of the foregoing methods, the smart charging schedule is further based on an energy consumption per mile value of the electrified vehicle.

In a further non-limiting embodiment of any of the foregoing methods, the smart charging schedule is further based on a current state of charge of the battery pack.

In a further non-limiting embodiment of any of the foregoing methods, the smart charging schedule is further based on calendar information from a mobile device of the driver.

In a further non-limiting embodiment of any of the foregoing methods, the smart charging schedule either adds charge to the battery pack or adds zero charge to the battery pack.

In a further non-limiting embodiment of any of the foregoing methods, controlling the charging includes creating a decision tree for determining an amount of charge necessary to complete an expected upcoming drive cycle of the electrified vehicle.

A vehicle system, according to another exemplary aspect of the present disclosure includes, among other things, a battery pack and a control system configured to create a smart charging schedule for either adding or not adding an additional charge to the battery pack in anticipation of an expected upcoming drive cycle. The smart charging schedule is prepared based on weather conditions, traffic conditions, and learned driving habits associated with the expected upcoming drive cycle.

In a further non-limiting embodiment of the foregoing vehicle system, a navigation system is configured to communicate GPS information to the control system.

In a further non-limiting embodiment of either of the foregoing vehicle systems, the control system includes at least one control module configured to control a charging system for selectively adding the additional charge to the battery pack.

In a further non-limiting embodiment of any of the foregoing vehicle systems, the charging system includes a switch selectively actuated to shut-off or prevent charging of the battery pack.

In a further non-limiting embodiment of any of the foregoing vehicle systems, the smart charging schedule is further based on at least one of GPS information, an energy consumption per mile value, a current state of charge of the battery pack, and calendar information.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes vehicle systems and methods for controlling charging of one or more energy storage devices of an electrified vehicle battery pack. An exemplary charging method includes controlling charging of a battery pack of an electrified vehicle based on at least climate conditions, traffic conditions, and learned driving habits of a driver of the electrified vehicle. A vehicle system may be programmed to control charging based on these and other factors in order to maximize the longevity of battery pack energy storage devices by minimizing the duration that the energy storage devices are maintained at or near a full state of charge. These and other features are discussed in greater detail in the following paragraphs of this detailed description.

Figure 1:
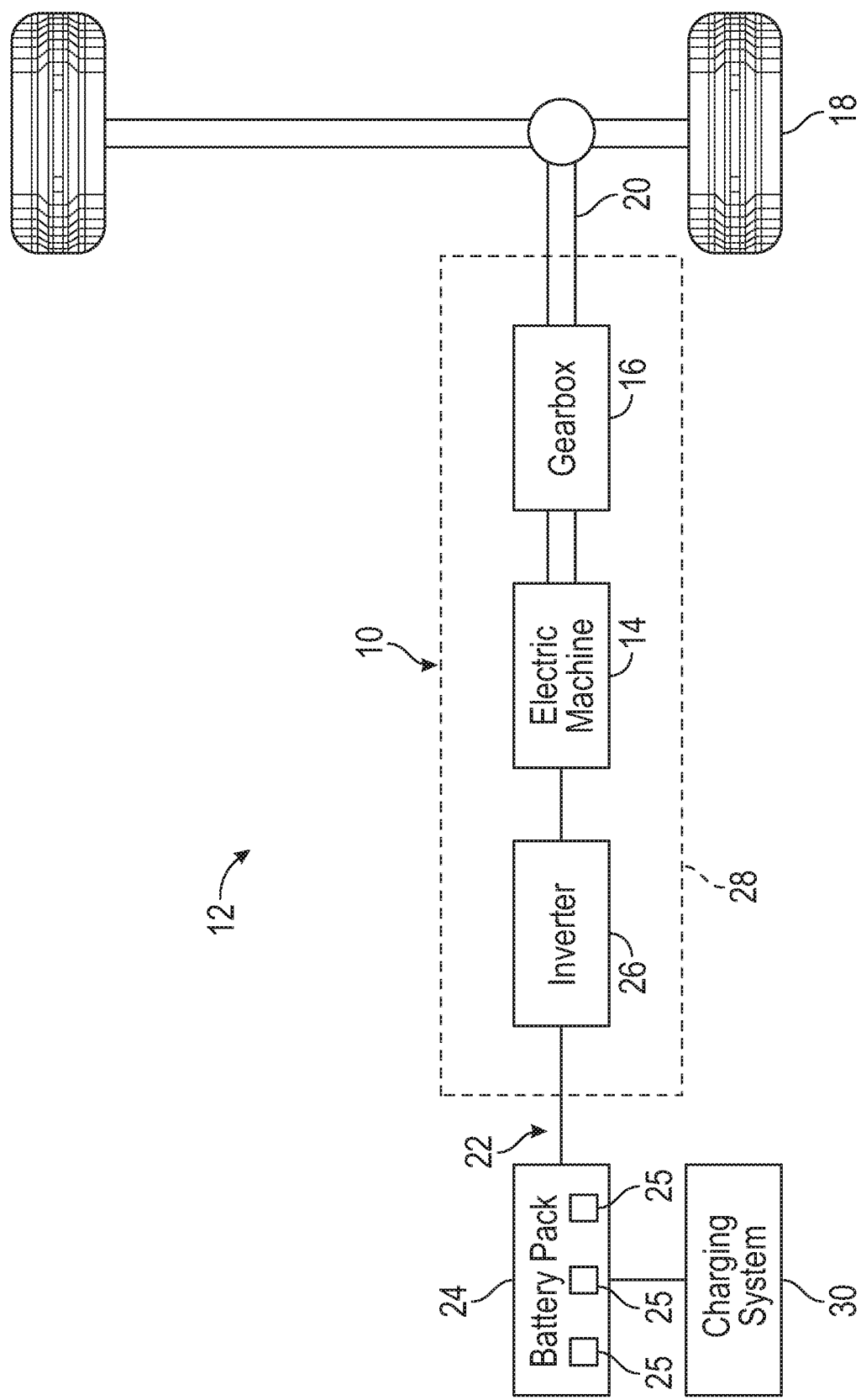
FIG. 1 schematically illustrates a powertrain of an electrified vehicle.

FIG. 1 schematically illustrates a powertrain 10 of an electrified vehicle 12. The electrified vehicle 12 may be a battery electric vehicle (BEV) or a plug-in hybrid electric vehicle (PHEV), for example. Therefore, although not shown in this embodiment, the electrified vehicle 12 could be equipped with an internal combustion engine that can be employed either alone or in combination with other energy sources to propel the electrified vehicle 12.

In the illustrated embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A voltage bus 22 electrically connects the electric machine 14 to a battery pack 24 through an inverter 26. The electric machine 14, the gearbox 16, and the inverter 26 may be collectively referred to as a transmission 28.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the electric machine 14 and/or other electrical loads of the electrified vehicle 12 for providing the power necessary to propel the wheels 18. Other types of energy storage devices and/or output devices can also be used to electrically power the electrified vehicle 12.

The electrified vehicle 12 is also be equipped with a charging system 30 for charging the energy storage devices (e.g., battery cells) of the battery pack 24. The charging system 30 can be connected to an external power source for receiving and distributing power received from the external power source to the battery pack 24.

The powertrain 10 of FIG. 1 is highly schematic and is not intended to limit this disclosure. Various additional components could alternatively or additionally be employed by the powertrain 10 within the scope of this disclosure. In addition, the teachings of this disclosure may be incorporated into any type of electrified vehicle, including but not limited to cars, trucks, sport utility vehicles, boats, planes, etc.

Figure 2:
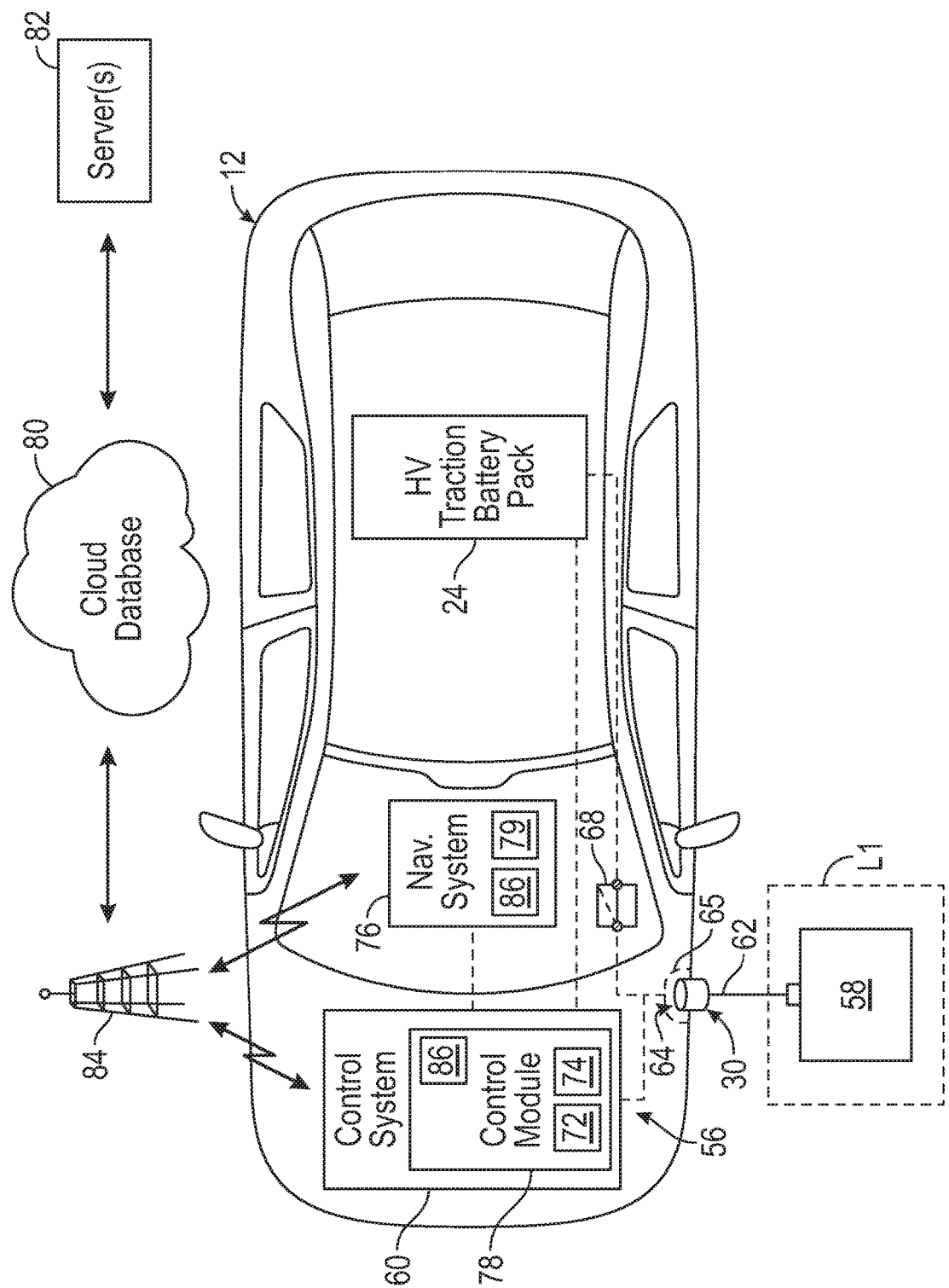
FIG. 2 schematically illustrates a vehicle system of an electrified vehicle.

FIG. 2 is a highly schematic depiction of a vehicle system 56 that may be employed within an electrified vehicle, such as electrified vehicle 12 of FIG. 1. The various components of the vehicle system 56 are shown schematically to better illustrate the features of this disclosure. These components; however, are not necessarily depicted in the exact locations at which they would be found in an actual vehicle.

The vehicle system 56 is adapted to control charging of the energy storage devices (e.g., battery cells) of a high voltage traction battery pack 24 in a manner that reduces battery degradation over the service life of the battery pack 24. For example, in an embodiment, the vehicle system 56 may intelligently control battery pack 24 charging by analyzing various factors, such as driving habits, vehicle status, external environmental conditions (e.g., weather, traffic, etc.), availability of charging infrastructure, etc., and then executing an optimized charging method based on these factors.

In an embodiment, the exemplary vehicle system 56 includes the battery pack 24, a charging system 30, a control system 60, and a navigation system 76. The battery pack 24 may include one or more battery arrays each having a plurality of battery cells or other energy storage devices. The energy storage devices of the battery pack 24 store electrical energy that is selectively supplied to power various electrical loads residing onboard the electrified vehicle 12. These electrical loads may include various high voltage loads (e.g., electric machines, etc.) or various low voltage loads (e.g., lighting systems, low voltage batteries, logic circuitry, etc.). The energy storage devices of the battery pack 24 are depleted of energy over time and therefore must be periodically recharged. Recharging can be achieved using the charging system 30 based on a smart charging control method executed by the control system 60, the details of which are further discussed below.

The charging system 30 may include a power cord 62 that connects between a charging port 64 of a vehicle inlet assembly 65 (located onboard the electrified vehicle 12) and an external power source 58. In an embodiment, the external power source 58 includes utility grid power. In another embodiment, the external power source 58 includes an alternative energy source, such as solar power, wind power, etc. In yet another embodiment, the external power source 34 includes a combination of utility grid power and alternative energy sources. The external power source 58 is located at a charging location L1. Exemplary charging locations include but are not limited to a public charging station located along the drive route, a driver's home, or a parking garage, for example.

Power from the external power source 58 may be selectively transferred over the power cord 62 to the electrified vehicle 12 for charging the energy storage devices of the battery pack 24. The charging system 30 may be equipped with power electronics configured to convert AC power received from the external power source to DC power for charging the energy source devices of the battery pack 24. The charging system 30 may also be configured to accommodate one or more conventional voltage sources from the external power source 58. In other embodiments, the charging system 30 could be a wireless charging system or a DC fast charging system.

In yet another embodiment, the charging system 30 includes a switch 68 for controlling the transfer of power to the battery pack 24. The switch 68 can be selectively actuated (i.e., opened) to stop or prevent charging the battery pack 24, such as when the battery pack 24 reaches a target state of charge (SOC) level at the charging location L1. In an embodiment, the switch 68 is movable between a closed position (shown in solid lines) in which power is permitted to flow to the battery pack 24 and an open position (shown in phantom lines) in which power is prohibited from flowing to the battery pack 24.

The control system 60 of the vehicle system 56 may control charging of the battery pack 24 by controlling operation of the charging system 30. For example, as further discussed below, the control system 60 may control the charging of the battery pack 24 in a manner that reduces the amount of time the battery pack 24 is maintained at or near a full state of charge. To achieve this, the control system 60 may control when charging begins and ends, the length of charging, the power levels of the charging, etc.

The control system 60 may be part of an overall vehicle control system or could be a separate control system that communicates with the vehicle control system. The control system 60 may include one or more control modules 78 equipped with executable instructions for interfacing with and commanding operation of various components of the vehicle system 56. For example, in an embodiment, each of the battery pack 24, the charging system 30, and the navigation system 76 include a control module, and these control modules can communicate with one another over a controller area network to control charging of the battery pack 24. In another non-limiting embodiment, each control module 78 of the control system 60 includes a processing unit 72 and non-transitory memory 74 for executing the various control strategies and modes of the vehicle system 56.

The navigation system 76 may include a global positioning system (GPS) configured for communicating drive route information to the control system 60. The navigation system 76 may include a user interface 79 located inside the electrified vehicle 12 for displaying the drive route and other related information. A user may interact with the user interface 79 via a touch screen, buttons, audible speech, speech synthesis, etc. In an embodiment, the drive route can be manually entered into the navigation system 76 using the user interface 79. In another embodiment, the drive route can be inferred based on historical data accumulated from prior drive routes the user has planned/traveled. Such historical route information may be saved within the navigation system 76 or within the non-transitory memory 74 of the control module 78 of the control system 60, for example.

The navigation system 76 may communicate additional information to the control system 60. This additional information could include the location of various charging locations along the drive route, charging costs associated with each charging location, etc.

In an embodiment, the control system 60 (and, optionally, the navigation system 76) may communicate over a cloud database 80 (i.e., the internet) to obtain various information stored on one or more servers 82. Each server 82 can identify, collect, and store user data associated with the electrified vehicle 12 for validation purposes. Upon an authorized request, data may be subsequently transmitted to the navigation system 76, or directly to the control system 60, via a cellular tower 84 or some other known communication technique (e.g., Wi-Fi, Bluetooth, etc.). The control system 60 and the navigation system 76 may each include a transceiver 86 for achieving bidirectional communication with the cellular tower 84. For example, the transceiver 86 can receive data from the server 82 or can communicate data back to the server 82 via the cellular tower 84. Although not necessarily shown or described in this highly schematic embodiment, numerous other components may enable bidirectional communication between the electrified vehicle 12 and the web-based servers 82.

The data received by the control system 60 from the navigation system 76 and/or the server 82 may be used in combination with other data to create a charging schedule for charging the battery pack 24. As discussed in greater detail below, the control system 60 may gather, analyze and/or calculate various data when planning the charging schedule.

Figure 3:
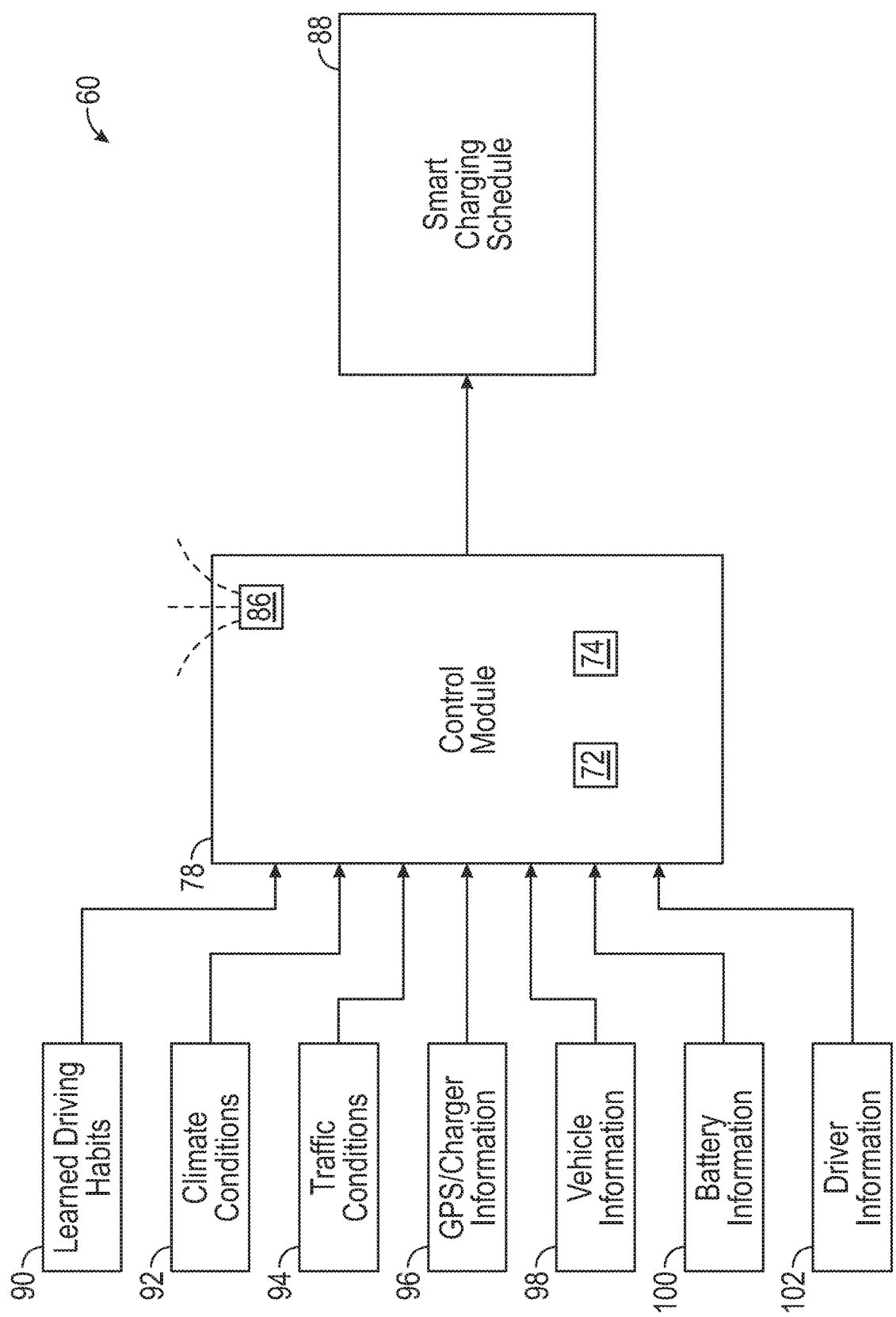
FIG. 3 is a block diagram illustrating a control system of the vehicle system of FIG. 2.

Referring now primarily to FIG. 3, the control module 78 of the control system 60 may receive and process various inputs for creating a smart charging schedule 88 for charging the battery pack 24. A first input to the control module 78 may include learned driving habits 90 of a driver of the electrified vehicle 12. The learned driving habits 90 may be inferred or learned values that are based on historical usage data associated with the electrified vehicle 12. For example, the control module 78 may learn the times a day the electrified vehicle 12 is operated by control logic and/or algorithms included within the control module 78. The learned times of day may correspond to a time of day on a specific day of the week based on the frequency or historical use of the electrified vehicle 12 relative to that time of day. In an embodiment, the learned times of day may further correspond to a time of day on a specific day of the week that the power cord 62 is removed from the vehicle inlet assembly 65 or any other action that is indicative of an expected upcoming vehicle drive cycle. The learned times may be recorded within the memory 74 of the control module 78 each time that signals are received by the control module 78 indicating that the power cord 62 is removed from the vehicle inlet assembly 65, or any other action that is indicative of an expected upcoming vehicle drive cycle. In an embodiment, a learning tool such as a probabilistic model or neural network is used to infer or predict the learned driving habits 90. In another embodiment, a cloud based computing tool can be used to provide the learned driving habits. However, the specific methodology used to predict the learned driving habits 90 is not intended to limit this disclosure.

A second input to the control module 78 may include climate conditions 92. The climate conditions 92 may be received from one of the servers 82 over the cloud database 80. In an embodiment, the climate conditions 92 include a prediction of the state of the ambient surroundings (e.g., temperature, sun, rain, wind, etc.) for a given location on a given date and time associated with the expected upcoming drive cycle.

A third input to the control module 78 may include traffic conditions 94. The traffic conditions 94 may be received from another one of the servers 82 over the cloud database 80. In an embodiment, the traffic conditions 94 include a prediction of the traffic situation (e.g., light, heavy, etc.) for a given location on a given date and time associated with the expected upcoming drive cycle.

A fourth input to the control module 78 may include GPS information 96 from the navigation system 76. The GPS information 96 may include but is not limited to location information (e.g., home, work place, etc.), date and time information (e.g., AM, PM, night, day, etc.), and charging location information (e.g., charging type, availability, costs, etc.).

A fifth input to the control module 78 may include vehicle information 98. The vehicle information 98 may be communicated from a vehicle control module that is separate from the control module 78 and may include information such as energy consumption per mile (i.e., kWh/mile), etc.

A sixth input to the control module 78 may include battery information 100. The battery information 100 may be communicated from a battery electric control module associated with the battery pack 24 and may include information such as current battery state of charge, battery temperature, battery age, etc.

A seventh input to the control module 78 may include driver information 102. The driver information 102 may be received from a personal electronic device, such as a cell phone, of the driver of the electrified vehicle and may include calendar information and other driver specific information.

Relying on the various inputs 90-102, the control module 78 may be programmed to execute one or more algorithms for creating the smart charging schedule 88. The smart charging schedule 88 can be used to control charging of the battery pack 24 during a subsequent charging event.

An exemplary implementation of an algorithm for creating the smart charging schedule 88 is as follows. In an embodiment, a classifier is used to categorize the trip history of a driver into actionable probability estimates for the amount of battery pack 24 charge needed to complete the driver's daily set of trips. The smart charging schedule 88 would only add charge to the battery pack 24 if the estimated charge required, plus some selectable charge safety margin, is greater than the existing state of charge of the battery pack 24. Before making any route estimates, the driver information 102 may be checked by accessing a calendar application on the driver's mobile device. If destinations are listed on the driver's calendar, a trip chain can be built from the probability determined driving distance and the calendar defined locations. The vehicle information 98, such as energy consumption per mile, can be combined with the trip chain to determine an amount of charge that is required to allow the driver to reach each of their destinations without experiencing range anxiety.

Figure 4:
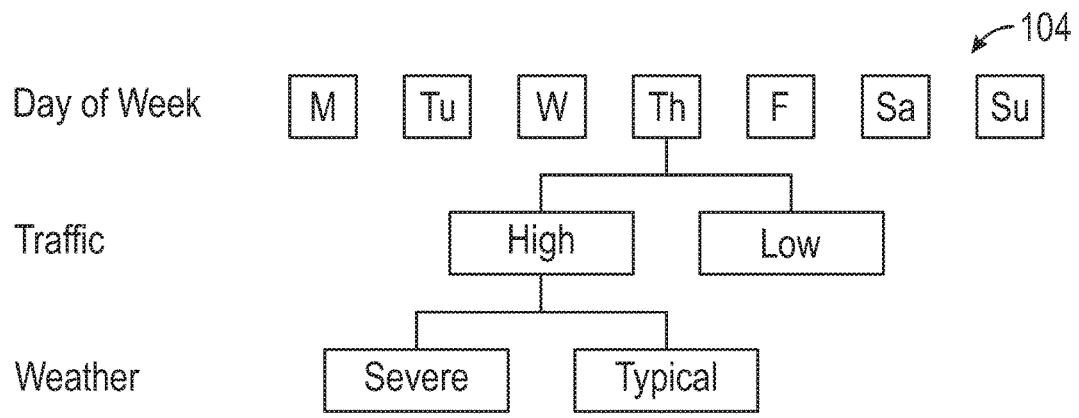
FIG. 4 is a decision tree that can be used for storing historical battery state of charge usage.

Alternatively, if the driver information 102 is not available (i.e., the driver's mobile device is not connected or is otherwise unavailable), the control module 78 may proceed by building a decision tree 104. As shown in FIG. 4, the decision tree 104 may have various branches including 1) the time period and day of the week for an expected upcoming drive cycle; 2) expected traffic conditions during the expected upcoming drive cycle; and 3) expected weather conditions during the expected upcoming drive cycle. Historical trip data can be binned into a total of 336 possible containers based on two hour segments for each of the seven days of the week combined with the binary factors rating the expected traffic conditions (e.g., high or low) and the expected weather conditions (e.g., typical or severe).

Each time the charging system 30 is activated for charging the battery pack 24, the control module 78 may execute the algorithm for determining the smart charging schedule 88 for a predefined amount of time, for example, 24 hours. The predefined amount of time can be adjusted based on the historical charging frequency of the driver.

Next, the historical net charge usage over the predefined amount of time can be analyzed to determine the probability of various charge options, for example, in 10 kWh increments. The net kWh required for the expected upcoming drive cycle is then compared to the present state of charge of the battery pack 24, and if the required amount of charge for the expected upcoming drive cycle exceeds the present state of charge of the battery pack 24, the charging system 30 is commanded to add charge to the battery pack 24. This may include controlling the charging system 30 to implement a combination of continuous and intermittent charging at multiple charging rates and regulating the battery pack 24 temperature before or during the charging. Otherwise, if the present state of charge exceeds the required amount of charge necessary to complete an expected upcoming drive cycle, no charge is added to the battery pack 24, or only enough charge is added to the battery pack 24 that is necessary to reach a safe state of charge level.

Figure 5:
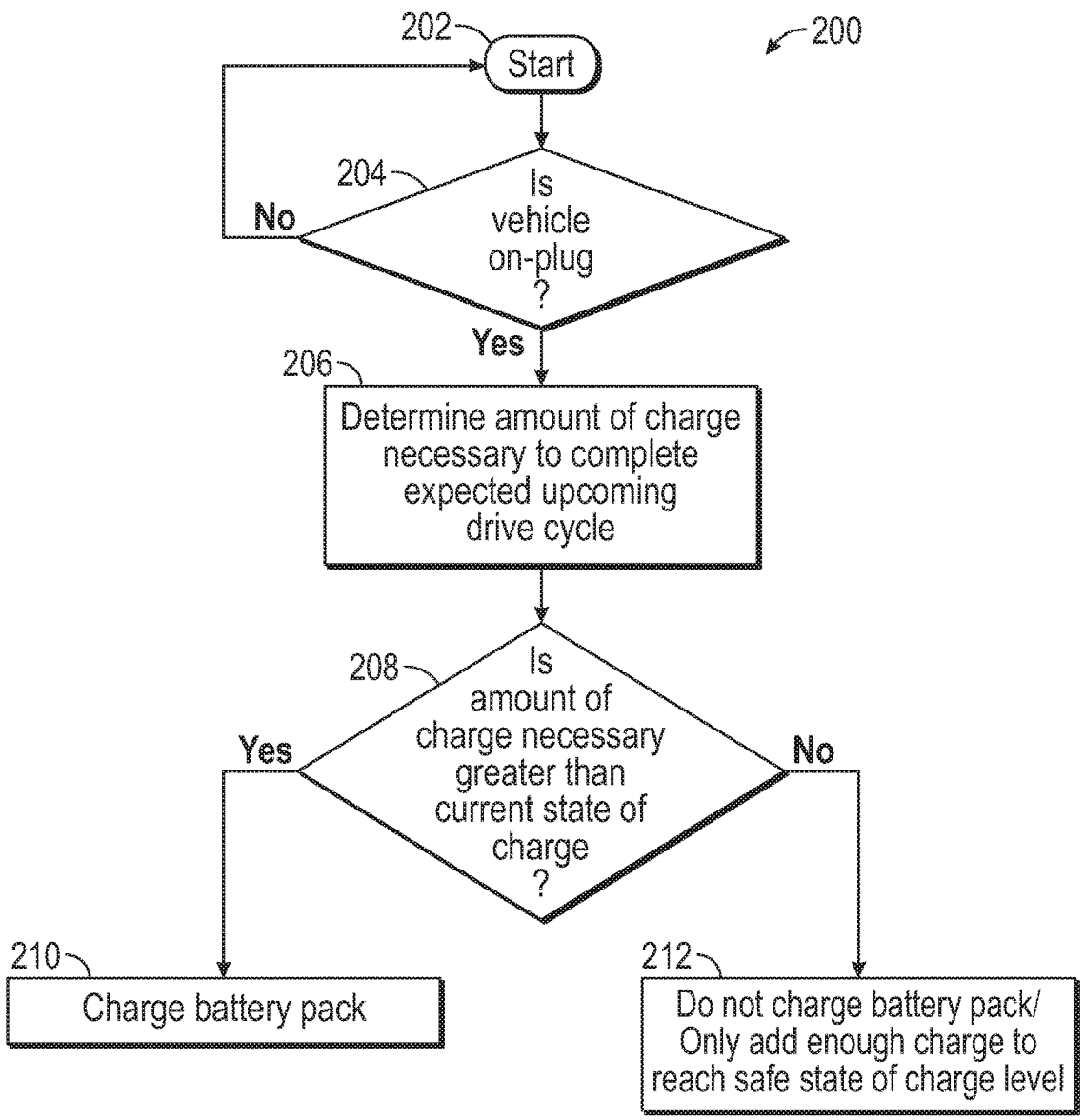
FIG. 5 schematically illustrates an exemplary method for controlling charging of a battery pack of an electrified vehicle.

FIG. 5, with continued reference to FIGS. 1-4, illustrates an exemplary method 200 for controlling charging of the battery pack 24 of the electrified vehicle 12. In an embodiment, the control module 78 is programmed with one or more algorithms adapted to execute the exemplary method 200.

The method 200 begins at block 202. At block 204, the control module 78 determines whether the electrified vehicle 12 is on-plug (i.e., the charging system 30 has been connected to an external power source). For example, the control module 78 may periodically analyze signals received from the charging system 30 to determine whether it has been connected to the external power source 58. If a YES flag is returned at block 204, the method 200 proceeds to block 206.

Next, at block 206, the control module 78 may determine the amount of charge necessary for powering the electrified vehicle 12 over an expected upcoming drive cycle. This may include analyzing each of the inputs 90-102.

The amount of charge necessary for the expected upcoming drive cycle is then compared with the current state of charge of the battery pack 24 at block 208. The state of charge of the battery pack 24 is increased at block 210 if the current state of charge is less than the amount of charge necessary for the upcoming drive cycle. Alternatively, charge is not added to the battery pack 24 at block 212 if the current state of charge is greater than the amount of charge necessary for the upcoming drive cycle.

The vehicle systems and methods of this disclosure provide intelligent charging of electrified vehicle energy storage devices by predicting a driver's intent in order to minimize the amount of time the energy storage devices are charged to a full or near full state of charge. The "smart" charging methods of this disclosure thus improve customer satisfaction, increase usable electric range over the vehicle's service life, and reduce warranty costs associated with degraded energy storage devices.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
controlling charging of a battery pack of an electrified vehicle, via a control system of the electrified vehicle, based on climate conditions, traffic conditions, and learned driving habits of a driver of the electrified vehicle,
wherein controlling the charging includes creating a smart charging schedule based on the climate conditions, the traffic conditions, and the learned driving habits,
wherein controlling the charging includes creating a decision tree for determining an amount of charge necessary to complete an expected upcoming drive cycle of the electrified vehicle,
wherein the decision tree includes a first branch indicating a time period and a day of a week for the expected upcoming drive cycle, a second branch indicating expected traffic conditions during the time period of the expected upcoming drive cycle, and a third branch indicating expected weather conditions during the time period of the expected upcoming drive cycle.

2. The method as recited in claim 1, wherein the smart charging schedule is further based on GPS information.

3. The method as recited in claim 1, wherein the smart charging schedule is further based on an energy consumption per mile value of the electrified vehicle.

4. The method as recited in claim 1, wherein the smart charging schedule is further based on a current state of charge of the battery pack.

5. The method as recited in claim 1, wherein the smart charging schedule is further based on calendar information from a mobile device of the driver.

6. The method as recited in claim 1, wherein the smart charging schedule either adds charge to the battery pack or adds zero charge to the battery pack.

7. The method as recited in claim 1, wherein controlling the charging includes determining an excepted upcoming drive cycle to be traveled by the electrified vehicle.

8. The method as recited in claim 7, wherein determining the expected upcoming drive cycle is based on historical route information associated with the electrified vehicle.

9. The method as recited in claim 1, wherein the learned driving habits include learned times of each day of a week that the electrified vehicle is operated by the user.

10. The method as recited in claim 9, wherein the learned times include a specific time of day on a specific day of the week that a power cord is removed from a vehicle inlet assembly of the electrified vehicle.

11. The method as recited in claim 1, comprising determining whether the electrified vehicle is on-plug.

12. The method as recited in claim 11, comprising determining an amount of charge necessary to complete an expected upcoming drive cycle of the electrified vehicle when the electrified vehicle is on-plug.

13. The method as recited in claim 12, comprising determining whether the amount of charge necessary to complete the expected upcoming drive cycle is greater than a current state of charge of the battery pack.

14. The method as recited in claim 13, comprising charging the battery pack when the amount of charge necessary to complete the expected upcoming drive cycle is greater than the current state of charge of the battery pack.

15. The method as recited in claim 13, comprising adding zero charge to the battery pack when the current state of charge of the battery pack exceeds the amount of charge necessary to complete the expected upcoming drive cycle.

16. A vehicle system, comprising:
a battery pack; and
a control system configured to create a smart charging schedule for either adding or not adding an additional charge to the battery pack in anticipation of an expected upcoming drive cycle, wherein the smart charging schedule is prepared based on weather conditions, traffic conditions, and learned driving habits associated with the expected upcoming drive cycle,
wherein the control system is configured to create a decision tree for determining an amount of charge necessary to complete the expected upcoming drive cycle,
wherein the decision tree includes a first branch indicating a time period and a day of a week for the expected upcoming drive cycle, a second branch indicating expected traffic conditions during the time period of the expected upcoming drive cycle, and a third branch indicating expected weather conditions during the time period of the expected upcoming drive cycle.

17. The vehicle system as recited in claim 16, comprising a navigation system configured to communicate GPS information to the control system.

18. The vehicle system as recited in claim 16, wherein the smart charging schedule is further based on at least one of GPS information, an energy consumption per mile value, a current state of charge of the battery pack, and calendar information.

19. The vehicle system as recited in claim 16, wherein the learned driving habits include a specific time of day on a specific day of a week that a power cord is removed from a vehicle inlet assembly by a user of a vehicle equipped with the vehicle system.

20. The vehicle system as recited in claim 16, wherein the control system includes at least one control module configured to control a charging system for selectively adding the additional charge to the battery pack.

21. The vehicle system as recited in claim 20, wherein the charging system includes a switch selectively actuated to shut-off or prevent charging of the battery pack when the battery pack reaches a target state of charge that is less than a full state of charge.

22. A method, comprising:
controlling charging of a battery pack of an electrified vehicle, via a control system of the electrified vehicle, based on climate conditions, traffic conditions, and learned driving habits of a driver of the electrified vehicle,
wherein controlling the charging includes creating a smart charging schedule based on the climate conditions, the traffic conditions, and the learned driving habits,
wherein controlling the charging includes:

categorizing a trip history of the driver into a plurality of actionable probability estimates that correspond to a state of charge of the battery pack necessary to complete an excepted upcoming drive cycle;

comparing the state of charge necessary to complete the expected upcoming drive cycle to a current state of charge of the battery pack;

charging the battery pack at a current charging location when the state of charge necessary to complete the expected upcoming drive cycle is greater than the current state of charge of the battery pack; and not charging the battery pack at the current charging location when the state of charge necessary to complete the expected upcoming drive cycle is less than the current state of charge of the battery pack.

23. The method as recited in claim 22, wherein the trip history is categorized within a classifier of the control system.

\* \* \* \* \*